(12) United States Patent
Huang et al.

(10) Patent No.: US 9,811,117 B2
(45) Date of Patent: Nov. 7, 2017

(54) ELECTRONIC DEVICE ASSEMBLY AND DOCK THEREOF

(71) Applicant: HTC Corporation, Taoyuan (TW)

(72) Inventors: Chien-Lung Huang, Taoyuan (TW); Yen-Te Chiang, Taoyuan (TW); Wen-Kai Tu, Taoyuan (TW); Po-Yi Chiang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 140 days.

(21) Appl. No.: 14/729,059

(22) Filed: Jun. 3, 2015

(65) Prior Publication Data

US 2015/0359124 A1 Dec. 10, 2015

Related U.S. Application Data

(60) Provisional application No. 62/008,521, filed on Jun. 6, 2014.

(51) Int. Cl.
*H05K 7/14* (2006.01)
*G06F 1/16* (2006.01)

(52) U.S. Cl.
CPC .................. *G06F 1/1632* (2013.01)

(58) Field of Classification Search
CPC ............................................. G06F 1/1632
USPC .................................................. 361/679.41
See application file for complete search history.

(56) References Cited

U.S. PATENT DOCUMENTS

| 6,042,414 A | 3/2000 | Kunert | |
| 6,069,790 A * | 5/2000 | Howell | G06F 1/1632 292/122 |
| 7,817,414 B2 * | 10/2010 | Chou | G06F 1/1632 361/679.41 |
| 2013/0107445 A1 * | 5/2013 | Reber | H04M 1/04 361/679.41 |
| 2014/0118923 A1 * | 5/2014 | Stanley | G06F 1/1626 361/679.41 |

FOREIGN PATENT DOCUMENTS

| CN | 203312487 | 11/2013 |
| TW | I318095 | 12/2009 |

OTHER PUBLICATIONS

"Notice of allowance of Taiwam Counterpart Application", dated Dec. 16, 2016, p. 1-p. 5.

* cited by examiner

*Primary Examiner* — Tuan T Dinh
*Assistant Examiner* — Rockshana Chowdhury
(74) *Attorney, Agent, or Firm* — JCIPRNET

(57) ABSTRACT

A dock for an electronic device is in capable of keeping conductive contacts within the dock until the electronic device is inserted into the dock. Furthermore, collision between an insertion portion of the electronic device and the conductive contacts can be avoided in the process of inserting the electronic device into the dock or removing the electronic device from the dock, so as to prevent the conductive contacts or the surface of the electronic device from being damaged. An electronic device assembly having the aforementioned dock is also provided.

17 Claims, 5 Drawing Sheets

ELECTRONIC DEVICE ASSEMBLY AND DOCK THEREOF

CROSS-REFERENCE TO RELATED APPLICATION

This application claims the priority benefits of U.S. provisional application Ser. No. 62/008,521, filed on Jun. 6, 2014. The entirety of the above-mentioned patent application is hereby incorporated by reference herein and made a part of this specification.

BACKGROUND OF THE INVENTION

Field of the Invention

The invention relates to a dock which is adapted to use with an electronic device and an electronic device assembly having said dock, and more particularly to an electronic device assembly having a dock which is capable of accommodating conductive contacts.

Description of Related Art

Along with technology development, many electronic devices are presented on the market, such as cellphone, tablet PC, multimedia player, satellite navigation device, etc. The electronic devices not only make people's lives become more convenient but also play an indispensable role in daily life.

Except the functions of communication and entertainment, the electronic devices may also be connected to other peripheral devices, such as earphones, electric chargers, speakers, etc., so as to satisfy requirements of the user under different circumstances. In addition, the electronic device can be used with a dock to provide functions, such as upright positioning, data transmission, and charging, etc.

SUMMARY OF THE INVENTION

The present application provides a dock for an electronic device which is capable of keeping conductive contacts within the dock until the electronic device is inserted into the dock. Furthermore, the collision between an insertion portion of the electronic device and the conductive contacts can be avoided in the process of inserting the electronic device into the dock or removing the electronic device from the dock, so as to prevent the conductive contacts or the surface of the electronic device from being damaged. Otherwise, as the electronic device has a metal housing, the dock in the present application can prevent the metal housing from contacting and conducting with the first conductive contacts, so as to prevent the spark being generated or other safety issues when the electronic device is in process of entering and departing from the recess.

In one embodiment of the present application, the dock includes a base body, a first linking member, a plurality of first conductive contacts, a first elastic member, and a second linking member. The base body has a recess for accommodating an insertion portion of the electronic device. The first linking member is pivoted about a first axis at the base body, and the first linking member has a leaning portion and an ejecting portion respectively located at two sides of the first axis. The first linking member is adapted to pivot about the first axis between a first position and a second position. When the first linking member is located at the first position, the leaning portion protrudes to the inside of the recess, and when the insertion portion of the electronic device enters the recess, the insertion portion leans on the leaning portion and drives the first linking member to pivot from the first position to the second position. The first conductive contacts are disposed on the ejecting portion of the first linking member. When the first linking member locates at the second position, the first conductive contacts contact a plurality of second conductive contacts on the insertion portion correspondingly. In addition, the first elastic member is disposed between the first linking member and the base body and adapted to store a first elastic potential energy when the first linking member is in process of moving from the first position to the second position. The second linking member is configured inside the base body and adapted to move between a lock position and an unlock position, wherein the second linking member in the lock position locates on a moving path of the first linking member in order to prevent the first linking member from returning to the first position from the second position. When the second linking member moves to the unlock position, the second linking member departs from a moving path of the first linking member in order to release the first elastic potential energy, which is stored by the first elastic member, for driving the first linking member to return to the first position.

The present application further provides an electronic device assembly on which the dock is applied, wherein the electronic device assembly includes the dock and the electronic device. The insertion portion of the electronic device is adapted to insert into the recess of the dock, and achieve the above-mentioned possible operation. The electronic device and the dock after combining can perform functions, such as the data transmission, and charging, etc.

In order to make the aforementioned and other features and advantages of the invention more comprehensible, embodiments accompanying figures are described in detail below.

DESCRIPTION OF THE EMBODIMENTS

Figure 1:
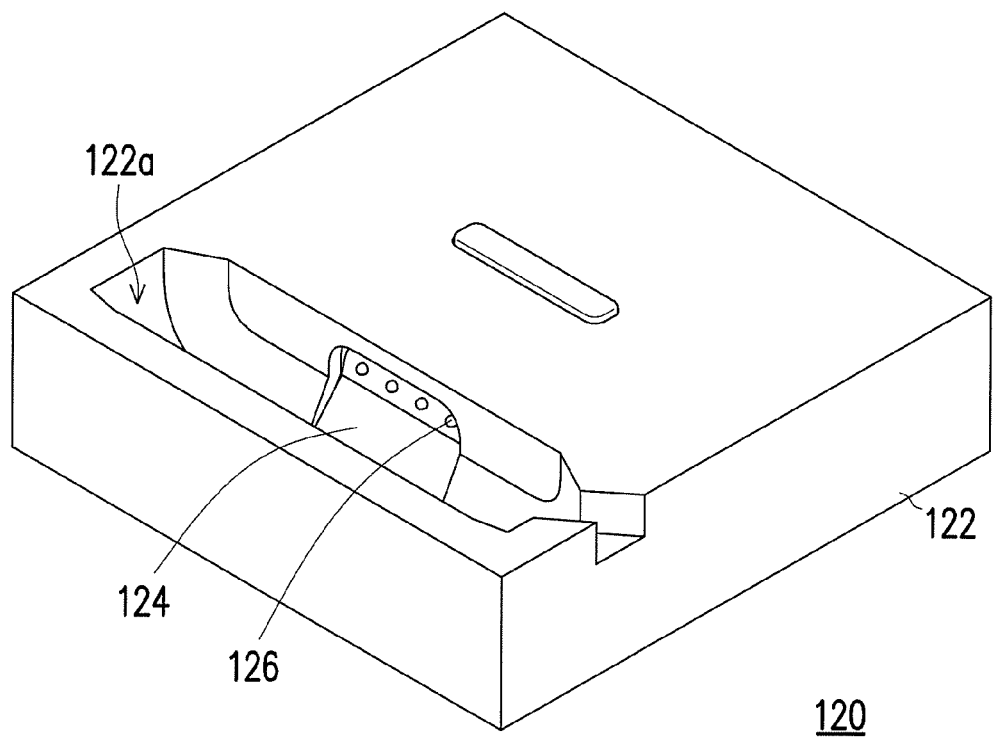
FIG. 1 is a three dimensional view of a dock according to one embodiment of the invention.
Figure 2:
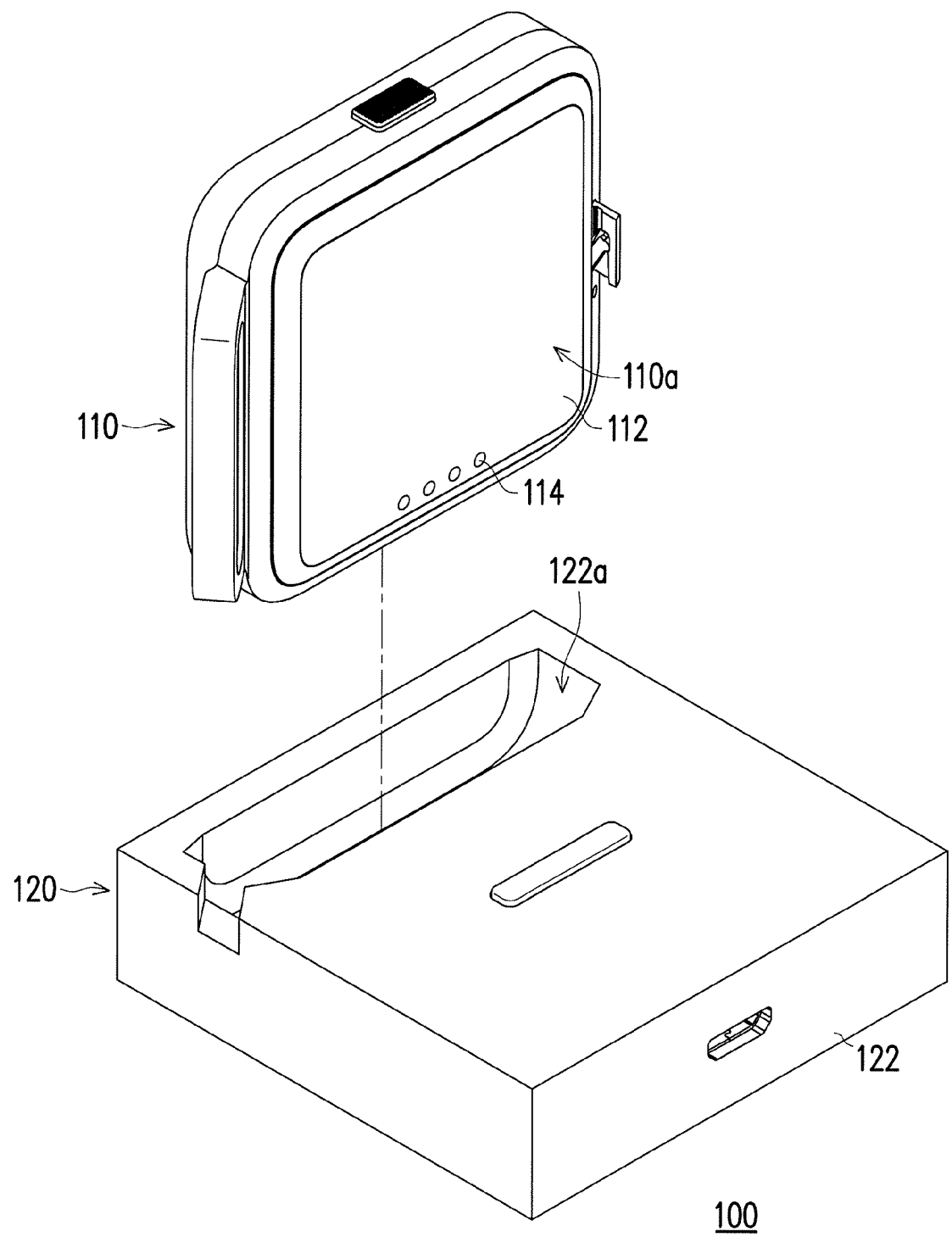
FIG. 2 is a schematic view of an assembly of an electronic device and a dock.

FIG. 1 is a three dimensional view of a dock according to one embodiment of the invention. FIG. 2 is a schematic view of an assembly of an electronic device and a dock. As shown in FIG. 1 and FIG. 2, an electronic device assembly 100 includes an electronic device 110 and a dock 120. The electronic device 110 includes an insertion portion 112 and a plurality of second conductive contacts 114 disposed on the insertion portion 112. In the present embodiment, the electronic device 110 is, for example, an electronic watch. However, in other embodiments, the electronic device 110 also can be electronic bracelet, cellphone, tablet PC, multimedia player, satellite navigation device, or other electronic devices which have conductive contacts being exposed. In the present embodiment, the second conductive contacts 114 are, for example, metal contacts located and exposed on the back side surface 110a of the electronic device 110. A base body 122 of the dock 120 includes a recess 122a for accommodating the insertion portion 112 of the electronic device 110. The insertion portion 112 of the electronic device 110 can be inserted into the recess 122a of the base body 122 in upright orientation and combined with the dock 120.

A first linking member 124 and a plurality of first conductive contacts 126 disposed on the first linking member 124 are configured inside the recess 122a of the base body 122. In the present embodiment, the first conductive contacts 126 are, for example, pogo pin connectors. After the insertion portion 112 of the electronic device 110 is inserted into the recess 122a, the first linking member 124 is actuated by the insertion portion 112, so that the first conductive contacts 126 on the first linking member 124 and the second conductive contacts 114 on the insertion portion 112 are contacted and conducted with each other to perform the data transmission or to recharge the electronic device 110.

Figure 3:
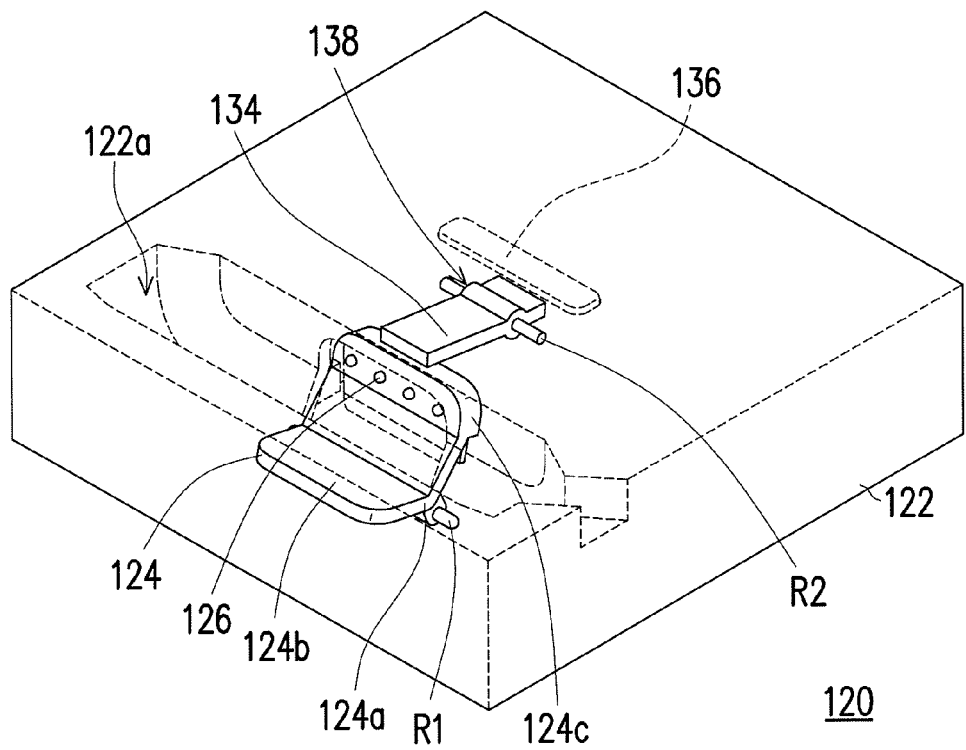
FIG. 3 is a partial perspective view of the dock in FIG. 1.
Figure 4:
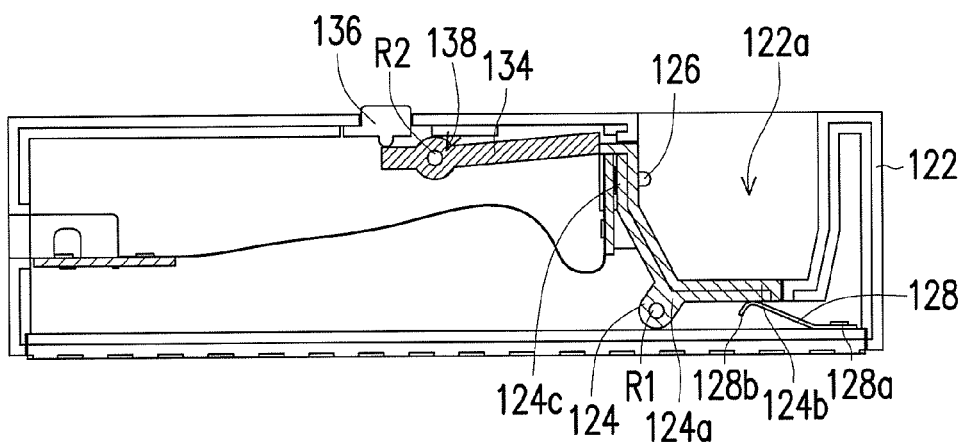
FIG. 4 is a cross-sectional view of the dock in FIG. 1.

FIG. 3 is a partial perspective view of the dock 120. FIG. 4 is a cross-sectional view of the dock 120. As shown in FIG. 3 and FIG. 4, the first linking member 124 is pivoted about a first axis R1 at the base body 122. The first linking member 124 in the present embodiment is, for example, an L-shaped link, wherein the first axis R1 locates at a transition portion 124a of the L-shaped link, and two opposite ends of the L-shaped link are a leaning portion 124b and an ejecting portion 124c of the first linking member 124 respectively.

In the present embodiment, the leaning portion 124b of the first linking member 124 locates at the bottom of the recess 122a, and the ejecting portion 124c locates at the sidewall of the recess 122a. In other words, the L-shaped link of the first linking member 124 constructs a part of the bottom and the sidewall, and when the insertion portion 112 of the electronic device 110 is inserted into the recess 112a, the first linking member 124 is driven by actuation between the leaning portion 124b and the insertion portion 112.

In addition, the first conductive contacts 126 are disposed on the ejecting portion 124c of the first linking member 124, so as to contact and are conducted to the second conductive contacts 114 of the insertion portion 112. A first elastic member 128 is disposed between the first linking member 124 and the base body 122 and adapted to store a first elastic potential energy when the first linking member 124 is in process of moving relatively to the base body 122. In addition, the first elastic member 128 is, for example, a leaf spring or other types of spring, one end 128a of the leaf spring is fixed at the bottom of the base body 122, and another end 128b of the leaf spring leans against the bottom of the leaning portion 124b of the first linking member 124. When the leaning portion 124b of the first linking member 124 moves towards the bottom of the base body 122, another end 128b of the first elastic member 128 is pressed down, so as to store the first elastic potential energy. In other embodiments, the first elastic member 128 also can be a torsion shaft or a torsion spring, which is disposed between the first linking member 124 and the base body 122 and adapted to store the first elastic potential energy when the first linking member 124 is in process of moving relatively to the base body 122.

In addition, in the present embodiment, a second linking member 134 is further configured inside the base body 122, and adapted to lock or unlock the first linking member 124 into the position, depending on whether the second linking member 134 and the first linking member 124 are structurally interfered with each other or not. The second linking member 134 in the present embodiment is, for example, a link which pivots about a second axis R2 at the base body 122 and between the lock position and the unlock position. In addition, the base body 122 of the dock 120 in the present embodiment further includes an unlock button 136 which is coupled to the second linking member 134, and the second linking member 134 is turned via the user manually pressing the unlock button 136. The dock 120 in the present embodiment further includes a second elastic member 138 which is disposed between the second linking member 134 and the base body 122 for storing a second elastic potential energy when the second linking member 134 is in process of moving relatively to the base body 122. For example, when the user applies a force on the unlock button 136 to make the second linking member 134 pivot relatively to the base body 122 so that the second elastic member 138 stores the second elastic potential energy. In addition, the second elastic member 138 also can be a torsion shaft or a torsion spring, which is disposed between the second linking member 134 and the base body 122 and adapted to store the second elastic potential energy when the second linking member 134 is in process of moving relatively to the base body 122.

Figure 5A:
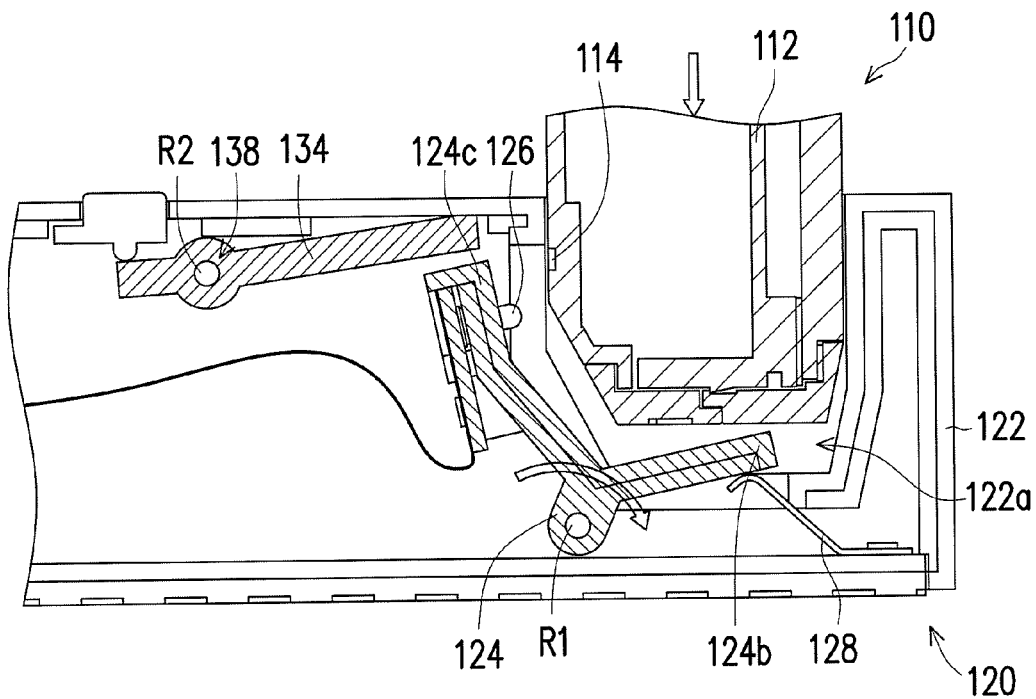
FIG. 5A depicts a state that the insertion portion of the electronic device has not yet entered the recess of the base body.
Figure 5B:
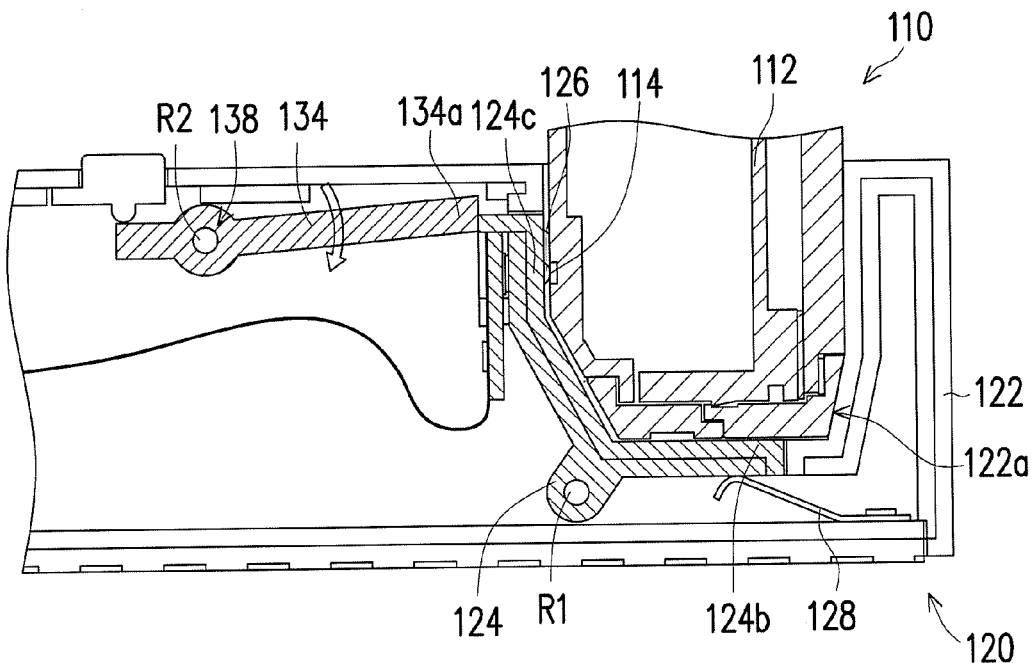
FIG. 5B depicts a state that the insertion portion of the electronic device enters the recess of the base body completely.

The process that the insertion portion 112 of the electronic device 110 is inserted into the recess 122a of the base body 122 to make the electronic device 110 combine with the dock 120 is specifically described as following. FIG. 5A depicts a state that the insertion portion 112 of the electronic device 110 has not yet entered the recess 122a of the base body 122. FIG. 5B depicts a state that the insertion portion 112 of the electronic device 110 enters the recess 122a of the base body 122 completely.

The first linking member 124 is adapted to pivot about the first axis R1 and between the first position as shown in FIG. 5A and the second position as shown in FIG. 5B. When the first linking member 124 is located at the first position as shown in FIG. 5A, the leaning portion 124b protrudes to the inside of the recess 122a, and when the insertion portion 112 of the electronic device 110 enters the recess 122a, the insertion portion 112 leans on the leaning portion 124b and drives the first linking member 124 to pivot in clockwise direction from the first position as shown in FIG. 5A to the second position as shown in FIG. 5B. When the first linking member 124 reaches the second position as shown in FIG. 5B, the first conductive contacts 126 contact the corresponding second conductive contacts 114 on the insertion portion 112. In addition, the first elastic member 128 deforms and stores the first elastic potential energy when the first linking member 124 is in process of moving from the first position as shown in FIG. 5A to the second position as shown in FIG. 5B.

On the other hand, the second linking member 134 is adapted to move between an unlock position as shown in FIG. 5A and a lock position as shown in FIG. 5B. As shown in FIG. 5A, when the first linking member 124 locates the first position, the second linking member 134 locates at the unlock position. In this moment, the first linking member 124 locates on the moving path of the second linking member 134, and prevents the second linking member 134 from moving from the unlock position to the lock position as shown in FIG. 5B. In addition, when the first linking member 124 in process of moving from the first position as shown in FIG. 5A to the second position as shown in FIG. 5B, the first linking member 124 gradually departs from the moving path of the second linking member 134. When the first linking member 124 reaches the second position as shown in FIG. 5B, the first linking member 124 completely departs from the moving path of the second linking member 134, so as to release the second elastic potential energy stored by the second elastic member 138 for driving the second linking member 134 to move to the lock position.

In this moment, as shown in FIG. 5B, the second linking member 134 in the lock position locates on the moving path of the first linking member 124 in order to prevent the first linking member 124 from returning to the first position as shown in FIG. 5A from the second position as shown in FIG. 5B. Based on the above, the second linking member 134 is, for example, a link, and a first end 134a of the link leans against the back side of the ejecting portion 124c of the first linking member 124, so as to prevent the first linking member 124 from rotating. Therefore, the first conductive contacts 126 on the first linking member 124 can contact tightly with the second conductive contacts 114 on the insertion portion 112.

Figure 6A:
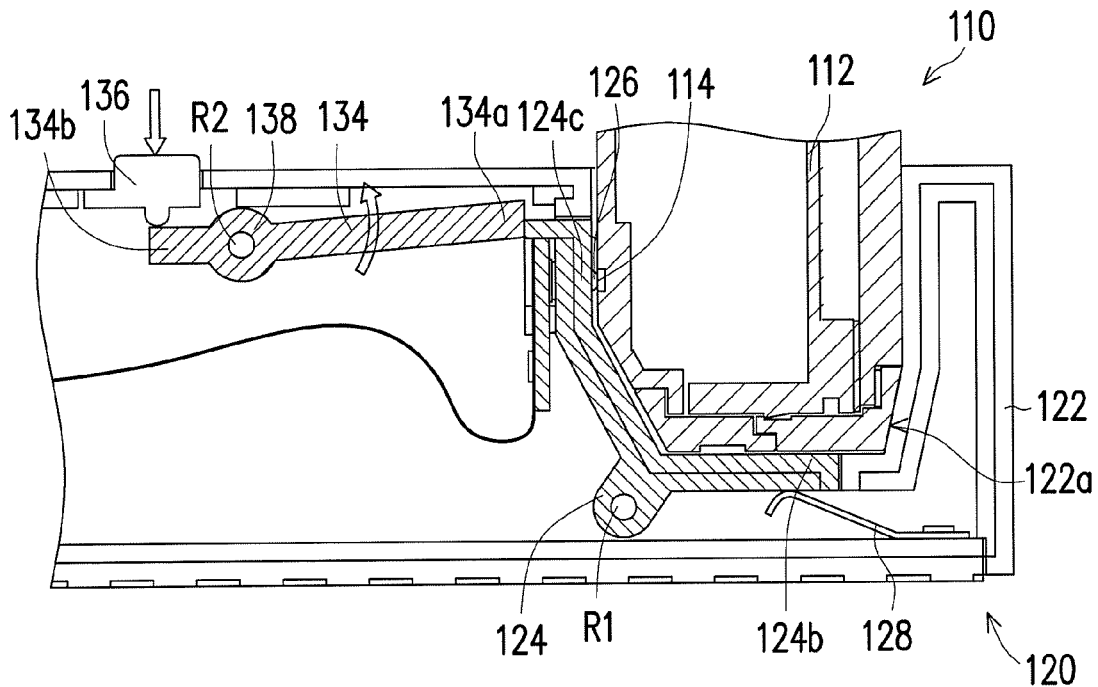
FIG. 6A depicts a state after the insertion portion of the electronic device and the recess of the base body being combined.
Figure 6B:
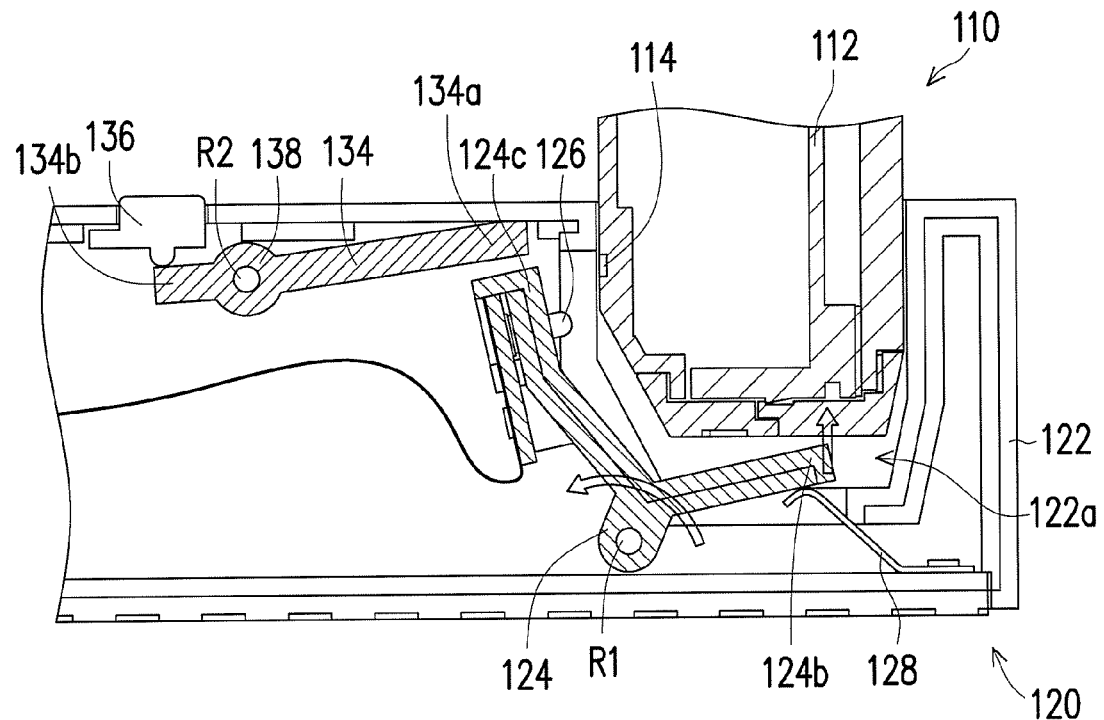
FIG. 6B depicts a state that the insertion portion of the electronic device and the recess of the base body are detached.

The process that the insertion portion 112 of the electronic device 110 departs from the recess 122a of the base body 122 to make the electronic device 110 detach from the dock 120 is further described as following. FIG. 6A depicts a state after the insertion portion 112 of the electronic device 110 and the recess 122a of the base body 122 being combined. FIG. 6B depicts a state that the insertion portion 112 of the electronic device 110 and the recess 122a of the base body 122 are detached.

When removing the electronic device 110 from the dock 120, as shown in FIG. 6A, the user can press the unlock button 136 which is coupled to a second end 134b of the second linking member 134, so that the second linking member 134 is driven to pivot from the lock position as shown in FIG. 6A towards the unlock position as shown in FIG. 6B by the unlock button 136. In addition, when the second linking member 134 pivots relatively to the base body 122, the second elastic member 138 stores the second elastic potential energy.

In the end, when the second linking member 134 moves to the unlock position as shown in FIG. 6B, the second linking member 134 departs from a moving path of the first linking member 124 and the first end 134a of the second linking member 134 also departs from the ejecting portion 124c of the first linking member 124 in order to release the first elastic potential energy stored by the first elastic member 128 for driving the first linking member 124 to pivot in a counterclockwise direction (as shown in FIG. 6) and to return to the first position. In this moment, the first conductive contacts 126 on the first linking member 124 departs from the second conductive contacts 114 on the insertion portion 112, and the insertion portion 112 of the electronic device 110 is driven by the leaning portion 124b to depart from the recess 122a.

Based on the above, from the FIGS. 5A-5B, FIGS. 6A-6b, and related descriptions, the operation that the electronic device and the dock are combined and detached in the present application can be comprehensible. At the state that the electronic device 110 is not inserted (as shown in FIG. 5A), the first conductive contacts 126 of the first linking member 124 are still kept inside the dock. In addition, the collision between an insertion portion 112 and the first conductive contacts 126 can be avoided when the insertion portion 112 of the electronic device 110 is in process of entering the recess 122a as shown in FIGS. 5A-5B, or when the insertion portion 112 of the electronic device 110 is in process of departing the recess 122a as shown in FIGS. 6A-6B, so as to prevent the first conductive contacts 126 from being damaged or to prevent the surface of the electronic device 110 from being damaged because of scratching with the first conductive contacts 126. Otherwise, because the electronic device 110 has a metal housing, the dock in the present application can prevent the metal housing from contacting and being conducted to the first conductive contacts 126, so as to prevent the spark other safety issues when the metal housing is in process of entering and departing from the recess 122a.

The electronic watch is used as an example in description of states of the electronic device assembly and the dock of the above-mentioned embodiments of the present application. However, the shape of the dock and the recess, or the size, the position, and the orientation of the recess, or the shape of the electronic watch, etc., are all used for demonstration and can be adjusted according to actual design of the product or actual requirements. In addition, in order to describe clearly the features of the present application, the known portions or contents of the existing technology that can be referred the related literature may be omitted in the Figures. In this technology field, people skilled in the art can comprehend the spirit and the technical solutions explained by the embodiments of the invention based on the description and the figures of the present application, and can adjust within the scope, and combine or replace relative elements.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A dock for an electronic device, comprising:
   a base body, having a recess for accommodating an insertion portion of the electronic device;
   a first linking member, pivoted about a first axis at the base body, wherein the first linking member has a leaning portion and an ejecting portion respectively located at two sides of the first axis, and the first linking member pivots about the first axis between a first position and a second position, when the first linking member locates at the first position, the leaning portion protrudes to an inside of the recess, and when the insertion portion of the electronic device enters the recess, the insertion portion leans on the leaning portion and drives the first linking member to pivot from the first position to the second position;
   a plurality of first conductive contacts, disposed on the ejecting portion of the first linking member, wherein when the first linking member pivots to the second position, the first conductive contacts move with the ejecting portion from inside the base body to the second position and contact a plurality of second conductive contacts on the insertion portion correspondingly;
   a first elastic member, disposed between the first linking member and the base body and stores a first elastic potential energy when the first linking member is in process of moving from the first position to the second position; and
   a second linking member, disposed inside the base body and moves between a lock position and an unlock position, wherein the second linking member in the lock position locates on a moving path of the first linking member in order to prevent the first linking member from returning to the first position from the second position, and when the second linking member moves to the unlock position, the second linking member departs from the moving path of the first linking member in order to release the first elastic potential energy stored by the first elastic member for driving the first linking member to return to the first position.

2. The dock for the electronic device as recited in claim 1, wherein the first linking member comprises an L-shaped link, the first axis locates at a transition portion of the L-shaped link, and the leaning portion and the ejecting portion locate at two opposite ends of the L-shaped link respectively.

3. The dock for the electronic device as recited in claim 2, wherein the leaning portion locates at a bottom of the recess, and the ejecting portion locates at a sidewall of the recess.

4. The dock for the electronic device as recited in claim 1, wherein the first elastic member comprises a spring, and the spring leans against and between the dock and the leaning portion.

5. The dock for the electronic device as recited in claim 1, wherein the second linking member comprises a link, the link pivots about a second axis at the base body and is adapted to pivot between the lock position and the unlock position, when the second linking member locates at the lock position, a first end of the link leans against a back side of the ejecting portion, and when the second linking member locates at the unlock position, the first end of the link departs from the ejecting portion.

6. The dock for the electronic device as recited in claim 5, further comprising an unlock button, wherein the unlock button is located on the base body and adapted to couple to a second end of the link for driving the link to pivot from the lock position to the unlock position.

7. The dock for the electronic device as recited in claim 1, further comprising a second elastic member, wherein the second elastic member is disposed between the second linking member and the base body for storing a second elastic potential energy when the second linking member is in process of moving from the lock position to the unlock position.

8. The dock for the electronic device as recited in claim 7, wherein the first linking member in the first position locates on a moving path of the second linking member in order to prevent the second linking member from returning to the lock position from the unlock position, when the first linking member moves to the second position, the first linking member departs from the moving path of the second linking member to release the second elastic potential energy stored by the second elastic member for driving the second linking member to return to the lock position.

9. An electronic device assembly, comprising:
an electronic device, having an insertion portion and a plurality of second conductive contacts disposed on the insertion portion; and
a dock comprising:
  a base body, having a recess for accommodating the insertion portion of the electronic device;
  a first linking member, pivoted about a first axis at the base body, wherein the first linking member has a leaning portion and an ejecting portion respectively located at two sides of the first axis, and the first linking member pivots about the first axis between a first position and a second position, when the first linking member is located at the first position, the leaning portion protrudes to an inside of the recess, and when the insertion portion of the electronic device enters the recess, the insertion portion leans on the leaning portion and drives the first linking member to pivot from the first position to the second position;
  a plurality of first conductive contacts, disposed on the ejecting portion of the first linking member, wherein when the first linking member pivots to the second position, the first conductive contacts move with the ejecting portion from inside the base body to the second position and contact a plurality of second conductive contacts on the insertion portion correspondingly;
  a first elastic member, disposed between the first linking member and the base body and stores a first elastic potential energy when the first linking member being in process of moving from the first position to the second position; and
  a second linking member, disposed inside the base body and moves between a lock position and an unlock position, wherein the second linking member in the lock position locates on a moving path of the first linking member in order to prevent the first linking member from returning to the first position from the second position, and when the second linking member moves to the unlock position, the second linking member departs from the moving path of the first linking member in order to release the first elastic potential energy stored by the first elastic member for driving the first linking member to return to the first position.

10. The electronic device assembly as recited in claim 9, wherein the first linking member comprises an L-shaped link, the first axis locates at a transition portion of the L-shaped link, and the leaning portion and the ejecting portion locate at two opposite ends of the L-shaped link respectively.

11. The electronic device assembly as recited in claim 10, wherein the leaning portion locates at a bottom of the recess, and the ejecting portion locates at a sidewall of the recess.

12. The electronic device assembly as recited in claim 9, wherein the first elastic member comprises a spring, and the spring leans against and between the dock and the leaning portion.

13. The electronic device assembly as recited in claim 9, wherein the second linking member comprises a link, the link pivots about a second axis at the base body and is adapted to pivot between the lock position and the unlock position, when the second linking member locates at the lock position, a first end of the link leans against a back side of the ejecting portion, and when the second linking member locates at the unlock position, the first end of the link departs from the ejecting portion.

14. The electronic device assembly as recited in claim 13, further comprising an unlock button, wherein the unlock button is located on the base body and adapted to couple to a second end of the link for driving the link to pivot from the lock position to the unlock position.

15. The electronic device assembly as recited in claim 9, further comprising a second elastic member, wherein the second elastic member is disposed between the second linking member and the base body for storing a second elastic potential energy when the second linking member is in process of moving from the lock position to the unlock position.

16. The electronic device assembly as recited in claim 15, wherein the first linking member in the first position locates on a moving path of the second linking member in order to prevent the second linking member from returning to the lock position from the unlock position, when the first linking member moves to the second position, the first linking member departs from the moving path of the second linking member to release the second elastic potential energy stored by the second elastic member for driving the second linking member to return to the lock position.

17. An electronic device assembly, comprising:
an electronic device, having an insertion portion and a plurality of second conductive contacts disposed on the insertion portion; and
a dock comprising:
a base body, having a recess for accommodating the insertion portion of the electronic device;
a first linking member, pivoted about a first axis at the base body, wherein the first linking member has a leaning portion and an ejecting portion respectively located at two sides of the first axis, and the first linking member pivots about the first axis between a first position and a second position, when the first linking member is located at the first position, the leaning portion protrudes to an inside of the recess, and when the insertion portion of the electronic device enters the recess, the insertion portion leans on the leaning portion and drives the first linking member to pivot from the first position to the second position;
a plurality of first conductive contacts, disposed on the ejecting portion of the first linking member, wherein when the first linking member locates at the second position, the first conductive contacts contact a plurality of second conductive contacts on the insertion portion correspondingly;
a first elastic member, disposed between the first linking member and the base body and stores a first elastic potential energy when the first linking member being in process of moving from the first position to the second position; and
a second linking member, disposed inside the base body and moving inside the base body between a lock position and an unlock position, wherein the second linking member comprises a link pivoting about a second axis at the base body and pivoting between the lock position and the unlock position, when the second linking member locates at the lock position, a first end of the link leans against a back side of the ejecting portion, and when the second linking member locates at the unlock position, the first end of the link departs from the ejecting portion, and the second linking member in the lock position locates on a moving path of the first linking member in order to prevent the first linking member from returning to the first position from the second position, and when the second linking member moves to the unlock position, the second linking member departs from the moving path of the first linking member in order to release the first elastic potential energy stored by the first elastic member for driving the first linking member to return to the first position.

* * * * *